(12) United States Patent
Liao

(10) Patent No.: US 11,144,134 B1
(45) Date of Patent: Oct. 12, 2021

(54) MOUSE DEVICE

(71) Applicant: Primax Electronics Ltd., Taipei (TW)

(72) Inventor: Zi-Hao Liao, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 17/184,213

(22) Filed: Feb. 24, 2021

(30) Foreign Application Priority Data

Dec. 25, 2020 (CN) .......................... 202011559476.0

(51) Int. Cl.
*G06F 3/0354* (2013.01)
(52) U.S. Cl.
CPC .................... *G06F 3/0354* (2013.01)
(58) Field of Classification Search
CPC ....................................................... G06F 3/0354
USPC ......................................................... 345/163
See application file for complete search history.

(56) References Cited

U.S. PATENT DOCUMENTS

| 10,698,503 | B2* | 6/2020 | Lu | G06F 3/033 |
| 2011/0063219 | A1* | 3/2011 | Min-Liang | G06F 3/03543 |
| | | | | 345/163 |
| 2017/0205879 | A1* | 7/2017 | Joseph | G06F 3/03544 |
| 2017/0357337 | A1* | 12/2017 | Chou | H02J 7/0042 |
| 2021/0212603 | A1* | 7/2021 | Gudibande | A61B 5/14532 |

* cited by examiner

*Primary Examiner* — Calvin C Ma
(74) *Attorney, Agent, or Firm* — Kirton McConkie; Evan R. Witt

(57) ABSTRACT

A mouse device includes a casing, a main circuit board and two replaceable switch modules. Each replaceable switch module includes a switch circuit board and a micro switch on the switch circuit board. Moreover, plural electrical contacts are disposed on a bottom surface of the switch circuit board. The replaceable switch modules are connected with corresponding pogo pin connectors on the main circuit board through the electrical contacts. The micro switches are optical micro switches or mechanical micro switches.

10 Claims, 7 Drawing Sheets

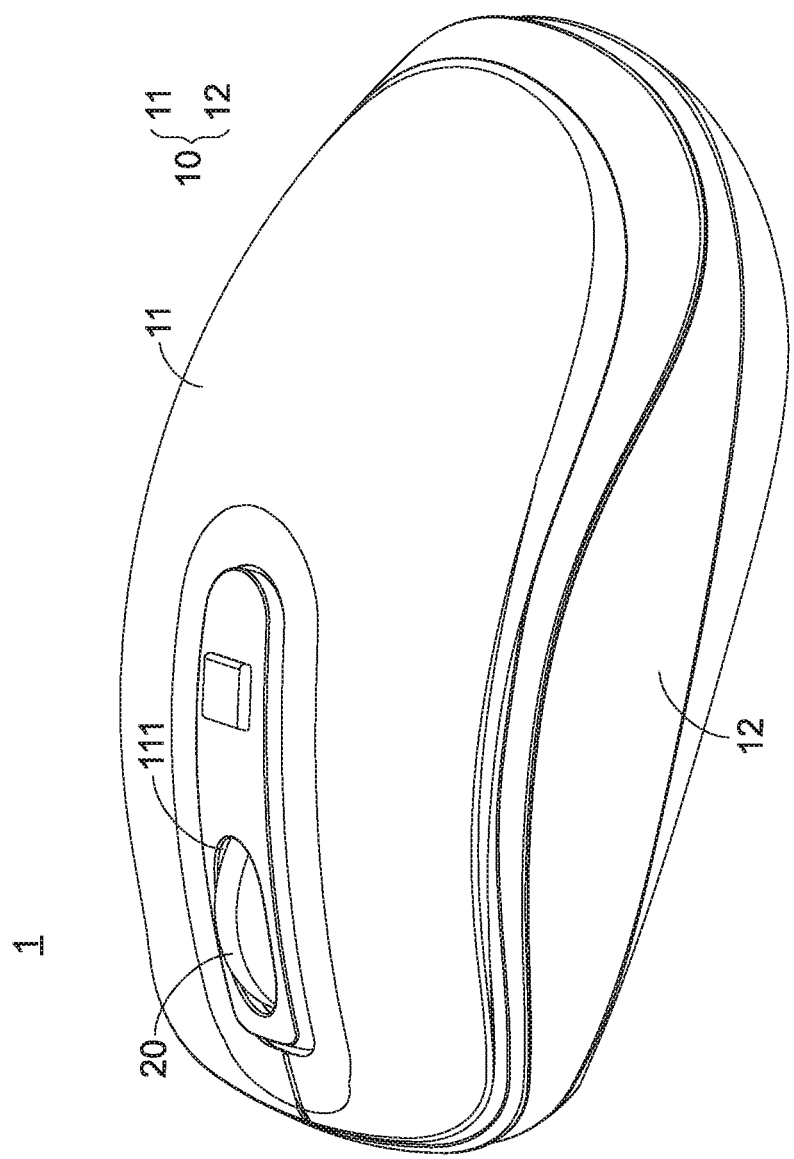

MOUSE DEVICE

FIELD OF THE INVENTION

The present invention relates to an input device, and more particularly to a mouse device.

BACKGROUND OF THE INVENTION

In modern societies, electronic devices become indispensable parts in human lives. A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system.

In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-button mouse device is gradually evolved into the modern wireless multi-button roller mouse device. For complying with different industrial needs or personal preferences, various electronic manufacturers have begun to create a variety of mouse device devices with different shapes in order to meet the operation requirements of different users.

Generally, the mouse device is equipped with a left button, a right button and a scroll wheel. In addition, two switch modules are located under the left button and the right button. The switch modules are optical micro switches or mechanical micro switches. The switch modules are directly installed on a main circuit board of the mouse device. However, if any switch module is damaged, it is necessary to remove the damaged switch module from the main circuit board and replace the damaged switch module with a new one during maintenance. That is, the maintenance is difficult. Moreover, since the switch module is fixed on the main circuit board, this installation cannot allow the user to replace switch module with a desired switch module (e.g., the switch module with better tactile feel) according to the user's preference.

For overcoming the drawbacks of the conventional technologies, there is a need of providing a mouse device with a quickly replaceable switch module.

SUMMARY OF THE INVENTION

The present invention provides a mouse device with a quickly replaceable switch module.

In accordance with an aspect of the present invention, a mouse device is provided. The mouse device includes a casing, a main circuit board and two replaceable switch modules. The casing includes an upper cover and a lower cover. The upper cover and the lower cover are permitted to be combined with each other. Moreover, two pressing parts are disposed on a bottom surface of an operation terminal of the upper cover. The main circuit board is located under the lower cover. Moreover, two pogo pin connectors are disposed on a top surface of the main circuit board. Each replaceable switch module includes a switch circuit board and a micro switch on the switch circuit board. Moreover, plural electrical contacts are disposed on a bottom surface of the switch circuit board. The two replaceable switch modules are connected with the corresponding pogo pin connectors through the corresponding electrical contacts. The micro switch is aligned with the corresponding pressing part. The micro switch is an optical micro switch or a mechanical micro switch.

In an embodiment, the pogo pin connector includes plural spring pins corresponding to the electrical contacts.

In an embodiment, each of the two replaceable switch modules includes a protecting shell, and the protecting shell includes an accommodation space. The accommodation space has an upper opening end and a lower opening end, which are opposed to each other.

In an embodiment, the switch circuit board and the micro switch are disposed within the accommodation space, and the micro switch includes a triggering part. The triggering part is exposed to the upper opening end and aligned with the corresponding pressing part.

In an embodiment, a handle part is protruded upwardly from a side of the upper opening end of the protecting shell. After the handle part is uplifted, the corresponding replaceable switch module is removable.

In an embodiment, each replaceable switch module further includes a covering plate, and the covering plate is fixed in the lower opening end. The covering plate includes a notch, and the notch is aligned with the plural electrical contacts. Consequently, the plural electrical contacts are exposed to the notch.

In an embodiment, each replaceable switch module further includes a first magnetic element, and the first magnetic element is fixed on the covering plate.

In an embodiment, the mouse device further includes a second magnetic element, and the second magnetic element is fixed on a bottom surface of the main circuit board and aligned with the first magnetic element. The opposite poles of the first magnetic element and the second magnetic element face each other. The replaceable switch module is fixed on the main circuit board in response to an attractive force between the first magnetic element and the second magnetic element.

In an embodiment, the covering plate further includes an accommodation recess. The accommodation recess is formed in a surface of the covering plate close to the switch circuit board. The first magnetic element is accommodated within the accommodation recess.

In an embodiment, the mouse device further includes an upper base, and the upper base is arranged between the lower cover and the upper cover. The main circuit board is covered by the upper base. Moreover, two receiving grooves run through the upper base. The two receiving grooves are aligned with the corresponding pogo pin connectors. The two replaceable switch modules are accommodated within the corresponding receiving grooves.

From the above descriptions, the mouse device of the present invention is advantageous over the conventional technology. For example, the replaceable switch module for the mechanical micro switch or the optical micro switch can be selected and installed according to the user's preference. In case that the replaceable switch module of the mouse device is damaged, the user can directly open the upper cover ad quickly remove the damaged replaceable switch module. Consequently, the damaged replaceable switch module can be replaced with a new one. Even if the switch module is damaged, it is not necessary to replace the whole mouse device. In other words, the mouse device of the present invention is industrially valuable.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1A is a schematic perspective view illustrating a mouse device according to an embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
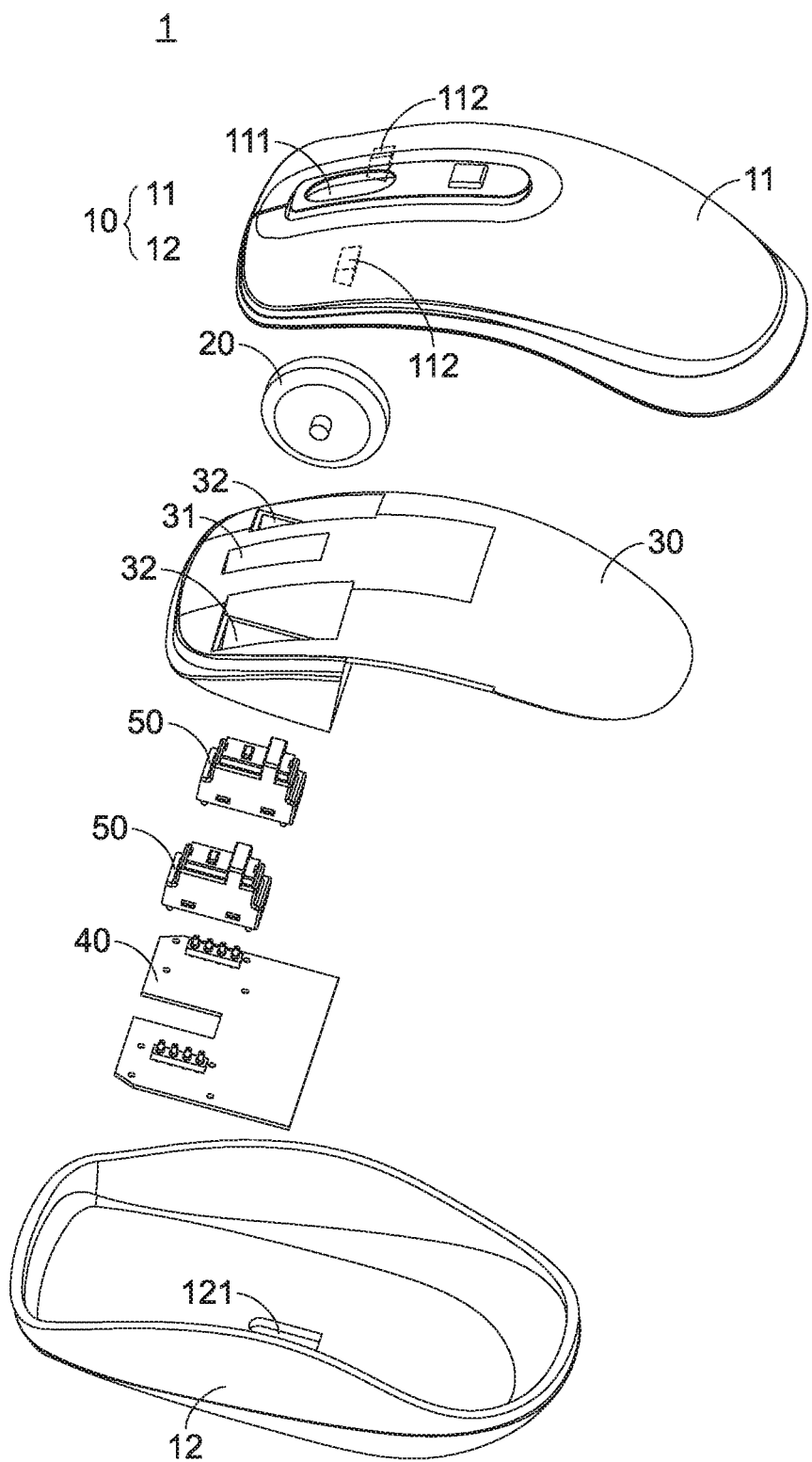
FIG. 1B is a schematic exploded view illustrating the mouse device according to the embodiment of the present invention.

Please refer to FIGS. 1A and 1B. FIG. 1A is a schematic perspective view illustrating a mouse device according to an embodiment of the present invention. FIG. 1B is a schematic exploded view illustrating the mouse device according to the embodiment of the present invention. The mouse device 1 comprises a casing 10, a scroll wheel 20, an upper base 30, a main circuit board 40 and two replaceable switch modules 50.

The casing 10 comprises an upper cover 11 and a lower cover 12. The upper cover 11 and the lower cover 12 can be combined with each other. The operation terminal of the upper cover 11 comprises a wheel opening 111. The wheel opening 111 runs through a middle region of the operation terminal of the upper cover 11. Moreover, two pressing parts 112 are disposed on the bottom surface of the operation terminal of the upper cover 11. The two pressing parts 112 are located beside two opposite sides of the wheel opening 111, respectively. The lower cover 12 comprises a detection hole 121. An optical sensing module (not shown) is installed in the detection hole 121. After the upper cover 11 and the lower cover 12 are combined together, the operation terminal of the upper cover 11 can still be swung upwardly or downwardly. Consequently, the operation terminal of the upper cover 11 can be used as the left button and the right button of the mouse device 1.

The main circuit board 40 is fixed on the lower cover 12. The upper base 30 is arranged between the lower cover 12 and the upper cover 11. In addition, the main circuit board 40 is covered by the upper base 30. In an embodiment, the upper cover 11 and the lower cover 12 are combined together through the upper base 30. The upper base 30 comprises a central slot 31 and two receiving grooves 32 corresponding to the operation terminal of the upper cover 11. The two receiving grooves 32 are located beside two opposite sides of the central slot 31. Moreover, the two receiving grooves 32 run through the upper base 30. The central slot 31 is aligned with the wheel opening 111 of the upper cover 11. The scroll wheel 20 is pivotally installed in the central slot 31. The upper rim of the scroll wheel 20 is partially exposed outside and protruded through the wheel opening 111.

When the scroll wheel 20 is pressed down or rotated by the user, a middle button signal or a rotation signal is generated. The two receiving grooves 32 are aligned with the two pressing parts 112 of the upper cover 11, respectively. The replaceable switch modules 50 are disposed within the corresponding receiving grooves 32 and electrically connected with the main circuit board 40. When the left side or the right side of the operation terminal of the upper cover 11 is pressed down, the corresponding pressing part 112 is moved downwardly to push the corresponding replaceable switch module 50. Consequently, a button signal corresponding to the left button or the right button is generated.

Figure 2A:
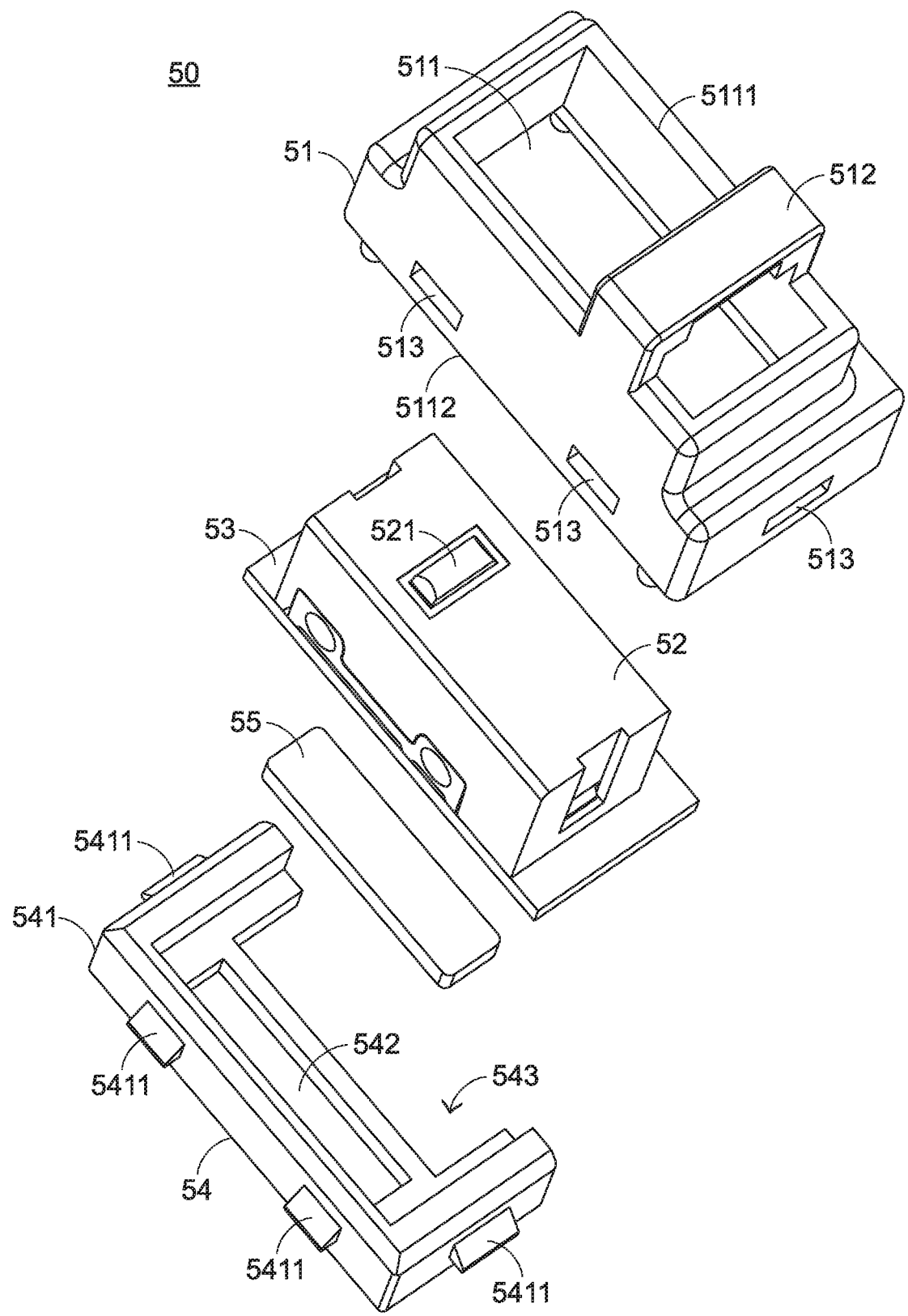
FIG. 2A is a schematic exploded view illustrating a first exemplary replaceable switch module of the mouse device of the present invention and taken along a viewpoint.
Figure 2B:
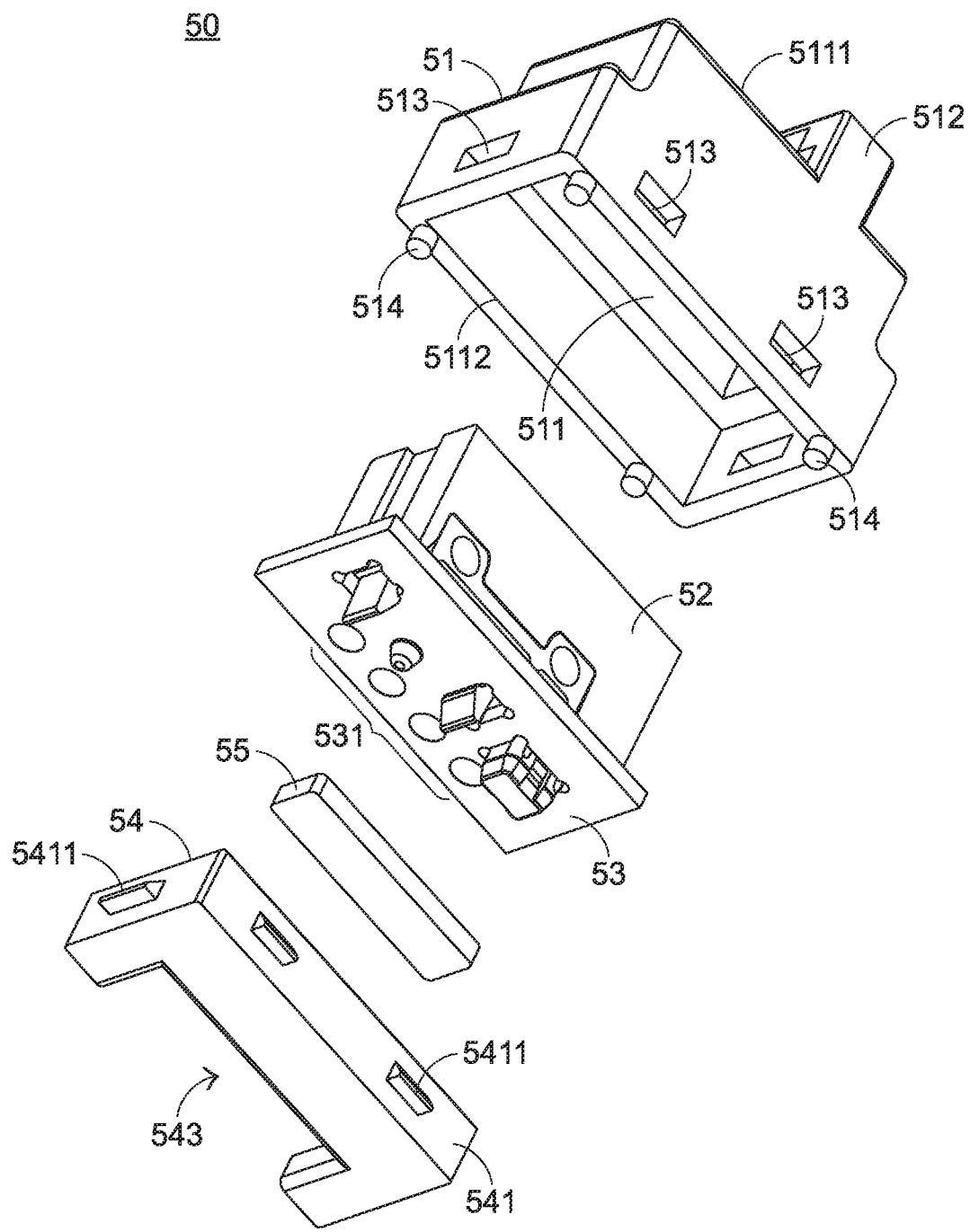
FIG. 2B is a schematic exploded view illustrating the first exemplary replaceable switch module as shown in FIG. 2A and taken along another viewpoint.

Please refer to FIGS. 2A and 2B. FIG. 2A is a schematic exploded view illustrating a first exemplary replaceable switch module of the mouse device of the present invention and taken along a viewpoint. FIG. 2B is a schematic exploded view illustrating the first exemplary replaceable switch module as shown in FIG. 2A and taken along another viewpoint. The replaceable switch module 50 comprises a protecting shell 51, a micro switch 52, a switch circuit board 53, a covering plate 54 and a magnetic element 55.

The protecting shell 51 comprises an accommodation space 511. The accommodation space 511 has an upper opening end 5111 and a lower opening end 5112, which are opposed to each other. The protecting shell 51 further comprises a handle part 512. The handle part 512 is protruded upwardly from a side of the upper opening end 5111 of the protecting shell 51. The protecting shell 51 further comprises plural position-limiting openings 513. The plural position-limiting openings 513 are formed in the lateral wall of the protecting shell 51 at the positions near the lower opening end 5112. The protecting shell 51 further comprises plural positioning pins 514. The plural positioning pins 514 are downwardly protruded from the side of the protecting shell 51 corresponding to the lower opening end 5112. In this embodiment, the plural positioning pins 514 are disposed on four corners of the lower opening end 5112.

The micro switch 52 is installed on the switch circuit board 53 and electrically connected with the switch circuit board 53. A triggering part 521 is disposed on a top surface of the micro switch 52.

Moreover, plural electrical contacts 531 are disposed on a bottom surface of the switch circuit board 53. In this embodiment, the micro switch 52 is an optical micro switch. The switch circuit board 53 and the micro switch 52 are disposed within the accommodation space 511. The triggering part 521 on the top surface of the micro switch 52 is exposed to the upper opening end 5111.

The covering plate 54 is fixed in the lower opening end 5112. Moreover, the covering plate 54 comprises a notch 543. The notch 543 is aligned with the plural electrical contacts 531 on the bottom surface of the switch circuit board 53. Consequently, the plural electrical contacts 531 are exposed to the notch 543.

The magnetic element 55 is fixed on the covering plate 54. In an embodiment, the covering plate 54 comprises three lateral wall parts 541. The three lateral wall parts 541 are located at three lateral sides of the covering plate 54 and perpendicular to each other. Moreover, plural position-limiting ribs 5411 are formed on the outer surfaces of the lateral wall parts 541 corresponding to the position-limiting openings 513 of the protecting shell 51. The notch 543 is located at the side of the covering plate 54 without the lateral wall part 541. The covering plate 54 further comprises an accommodation recess 542. The accommodation recess 542 is formed in the surface of the covering plate 54 close to the switch circuit board 53. The first magnetic element 55 is accommodated within the accommodation recess 542.

Moreover, after the first magnetic element 55 is fixed the accommodation recess 542, the covering plate 54 is upwardly introduced into the lower opening end 5112. After the position-limiting ribs 5411 of the lateral wall parts 541 are tight-fitted into the corresponding position-limiting openings 513 of the protecting shell 51, the covering plate 54 is fixed in the lower opening end 5112.

Figure 3A:
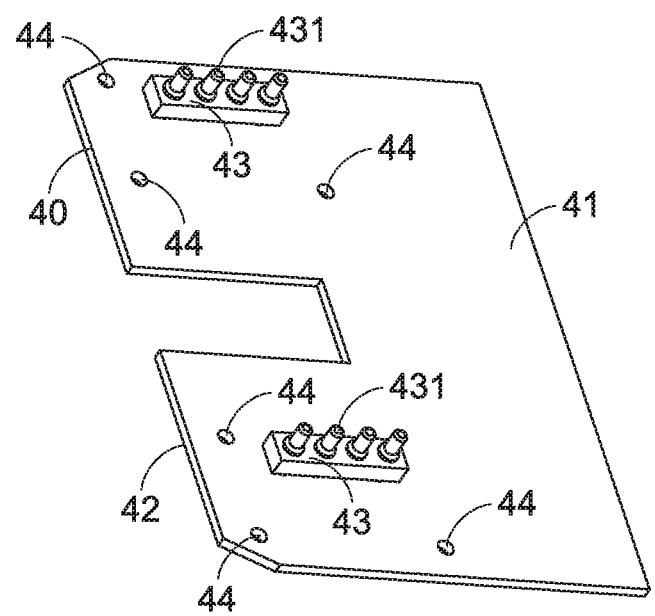
FIG. 3A is a schematic exploded view illustrating the main circuit board of the mouse device of the present invention and taken along a viewpoint.
Figure 3B:
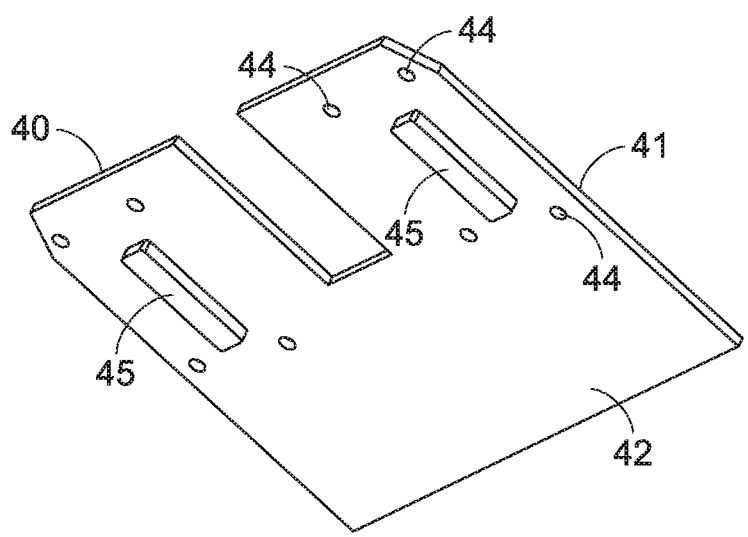
FIG. 3B is a schematic exploded view illustrating the main circuit board as shown in FIG. 3A and taken along another viewpoint.

Please refer to FIGS. 3A and 3B. FIG. 3A is a schematic exploded view illustrating the main circuit board of the mouse device of the present invention and taken along a viewpoint. FIG. 3B is a schematic exploded view illustrating the main circuit board as shown in FIG. 3A and taken along another viewpoint. The main circuit board 40 has a top surface 41 and a bottom surface 42. Moreover, two pogo pin connectors 43 are disposed on the top surface 41 of the main circuit board 40. Each pogo pin connector 43 comprises plural spring pins 431 corresponding to the electrical contacts 531 of the switch circuit board 53. As shown in FIG. 1B, the two receiving grooves 32 of the upper base 30 are aligned with the corresponding pogo pin connectors 43. When the upper base 30 is installed on the lower cover 12 to cover the main circuit board 40, the pogo pin connectors 43 are installed in and exposed to the corresponding receiving grooves 32.

Please refer to FIG. 3B again. The main circuit board 40 further comprises two second magnetic elements 45. The two second magnetic elements 45 are installed on an area of the bottom surface 42 corresponding to the two replaceable switch modules 50. Each second magnetic element 45 is aligned with the first magnetic element 55 of the corresponding replaceable switch module 50. In an embodiment, the first magnetic element 55 and the second magnetic element 45 are permanent magnets. Moreover, the opposite poles of the first magnetic element 55 and the second magnetic element 45 face each other. The main circuit board 40 further comprises plural positioning holes 44. The plural positioning holes 44 run through the main circuit board 40. The plural positioning holes 44 are arranged around the pogo pin connectors 43. In addition, the plural positioning holes 44 are aligned with the corresponding positioning pins 514 at the lower opening end 5112 of the protecting shell 51.

Please refer to FIGS. 1B, 2A, 2B, 3A and 3B again. A process of installing the replaceable switch module 50 will be described as follows. Firstly, the upper cover 11 is opened. Then, the replaceable switch module 50 is placed in the corresponding receiving groove 32 of the upper base 30. Then, the positioning pins 514 at the lower opening end 5112 of the protecting shell 51 are penetrated through the corresponding positioning holes 44 of the main circuit board 40. Consequently, the replaceable switch module 50 is positioned on the main circuit board 40. Since the pole of the first magnetic element 55 of the replaceable switch module 50 and the unlike pole of the second magnetic element 45 of the main circuit board 40 face each other, the replaceable switch module 50 can be temporarily fixed on the main circuit board 40 in response to the attractive force between the first magnetic element 55 and the second magnetic element 45. At the same time, the spring pins 431 of the pogo pin connector 43 of the main circuit board 40 are penetrated through the notch 543 and electrically connected with the corresponding electrical contacts 531 of the replaceable switch module 50. Consequently, the replaceable switch module 50 is electrically connected with the pogo pin connector 43 of the main circuit board 40.

When the left side or the right side of the operation terminal of the upper cover 11 is pressed down, the corresponding pressing part 112 on the bottom surface of the upper cover 11 is moved downwardly to push the corresponding triggering part 521 on the top surface of the micro switch 52. Consequently, the replaceable switch module 50 generates the button signal corresponding to the left button or the right button.

In case that the replaceable switch module 50 is damaged or the switch module for implementing other function in a different mode is ready to be changed, the user may open the upper cover 11. Then, the handle part 512 of the replaceable switch module 50 is uplifted with the users' finger. Consequently, the replaceable switch module 50 can be quickly removed from the corresponding receiving groove 32, and another replaceable switch module 50 will be placed into the corresponding receiving groove 32. In the above embodiment, the mechanism for fixing the replaceable switch module 50 comprises the magnetic elements, the positioning pins, the positioning holes and the receiving grooves of the upper base. It is noted that the positioning mechanism may include only one of the above positioning means. For example, in another embodiment, the magnetic elements are used to position and fix the replaceable switch module, but the positioning pins and the positioning holes are omitted. Alternatively, the replaceable switch module is fixed and positioned through the engagement between the pogo pin connector 43 and the corresponding electrical contacts 531.

Figure 4A:
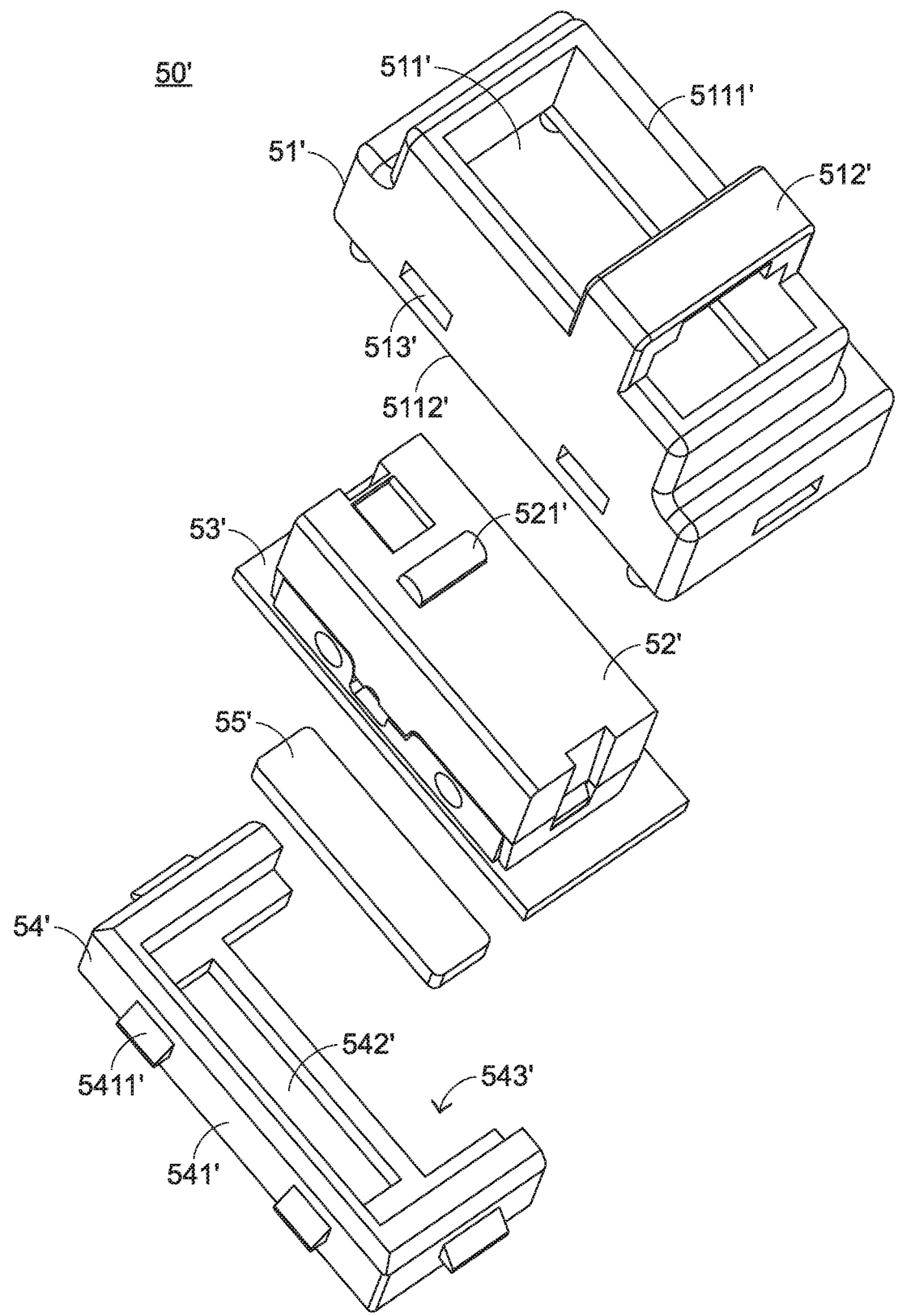
FIG. 4A is a schematic exploded view illustrating a second exemplary replaceable switch module of the mouse device of the present invention and taken along a viewpoint.
Figure 4B:
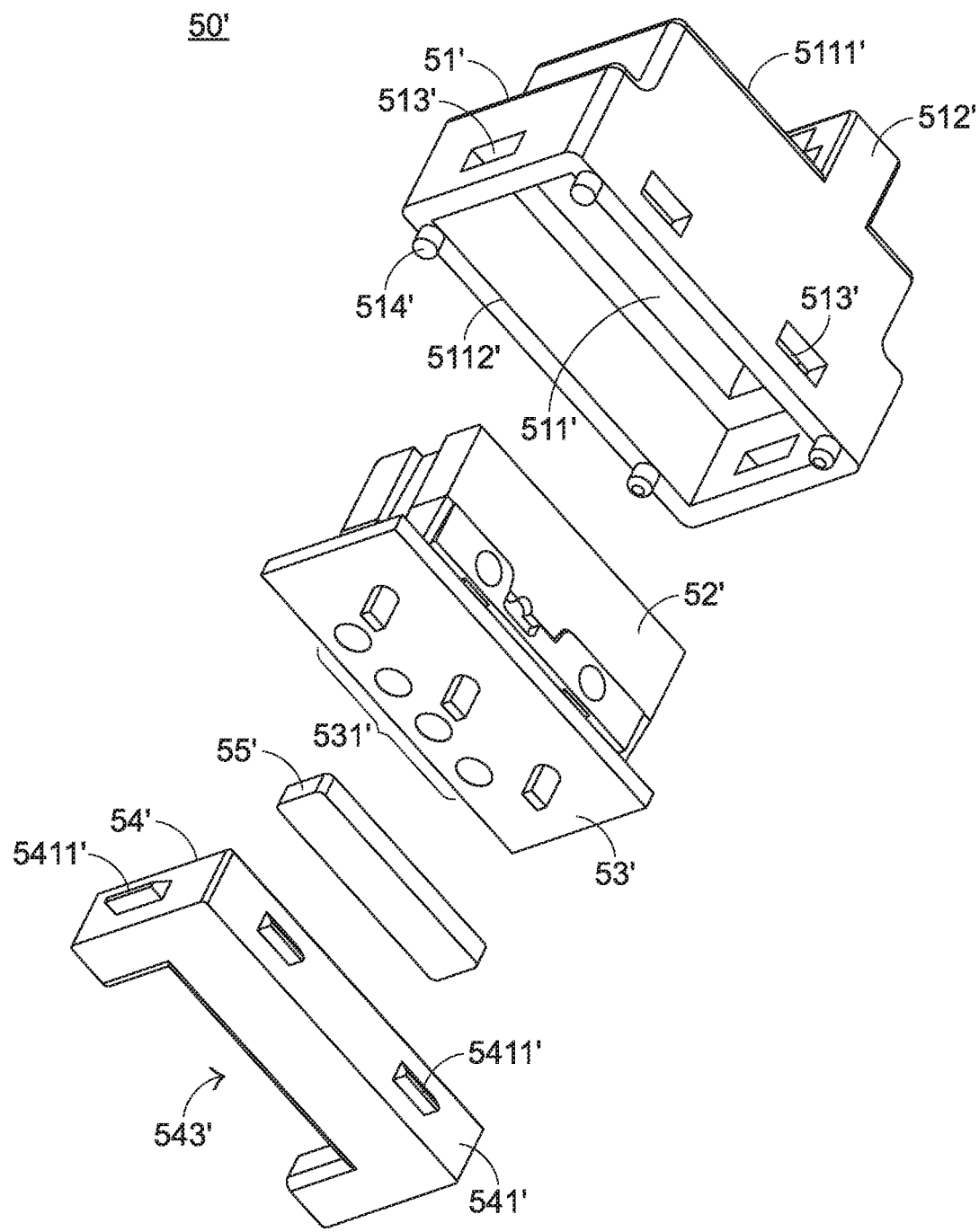
FIG. 4B is a schematic exploded view illustrating the second exemplary replaceable switch module as shown in FIG. 4A and taken along another viewpoint.

Please refer to FIGS. 4A and 4B. FIG. 4A is a schematic exploded view illustrating a second exemplary replaceable switch module of the mouse device of the present invention and taken along a viewpoint. FIG. 4B is a schematic exploded view illustrating the second exemplary replaceable switch module as shown in FIG. 4A and taken along another viewpoint. The replaceable switch module 50' comprises a protecting shell 51', a micro switch 52', a switch circuit board 53', a covering plate 54' and a magnetic element 55'.

The structures and functions of the components of the replaceable switch module which are identical to those of the first embodiment as shown in FIGS. 2A and 2B are not redundantly described herein. In comparison with the first embodiment, the micro switch 52' of this embodiment is a mechanical micro switch. The switch circuit board 53 and the switch circuit board 53' are suitable for the mechanical micro switch or the optical micro switch. In addition, a general pogo pin connector (not shown) is installed on the main circuit board (not shown). Consequently, the replaceable switch module 50 or 50' for the mechanical micro switch or the optical micro switch can be selected and installed according to the user's preference.

From the above descriptions, the mouse device of the present invention is advantageous over the conventional technology. For example, the replaceable switch module for the mechanical micro switch or the optical micro switch can be selected and installed according to the user's preference. In case that the replaceable switch module of the mouse device is damaged, the user can directly open the upper cover ad quickly remove the damaged replaceable switch module. Consequently, the damaged replaceable switch module can be replaced with a new one. Even if the switch module is damaged, it is not necessary to replace the whole mouse device. In other words, the mouse device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
    a casing comprising an upper cover and a lower cover, wherein the upper cover and the lower cover are permitted to be combined with each other, and two pressing parts are disposed on a bottom surface of an operation terminal of the upper cover;
    a main circuit board located under the lower cover, wherein two pogo pin connectors are disposed on a top surface of the main circuit board; and
    two replaceable switch modules, wherein each replaceable switch module comprises a switch circuit board and a micro switch on the switch circuit board, and plural electrical contacts are disposed on a bottom surface of the switch circuit board,
    wherein the two replaceable switch modules are connected with the corresponding pogo pin connectors through the corresponding electrical contacts, the micro switch is aligned with the corresponding pressing part, and the micro switch is an optical micro switch or a mechanical micro switch.

2. The mouse device according to claim 1, wherein the pogo pin connector comprises plural spring pins corresponding to the electrical contacts.

3. The mouse device according to claim 1, wherein each of the two replaceable switch modules comprises a protecting shell, and the protecting shell comprises an accommodation space, wherein the accommodation space has an upper opening end and a lower opening end, which are opposed to each other.

4. The mouse device according to claim 3, wherein the switch circuit board and the micro switch are disposed within the accommodation space, and the micro switch comprises a triggering part, wherein the triggering part is exposed to the upper opening end and aligned with the corresponding pressing part.

5. The mouse device according to claim 3, wherein a handle part is protruded upwardly from a side of the upper opening end of the protecting shell, wherein after the handle part is uplifted, the corresponding replaceable switch module is removable.

6. The mouse device according to claim 3, wherein each replaceable switch module further comprises a covering plate, and the covering plate is fixed in the lower opening end, wherein the covering plate comprises a notch, and the notch is aligned with the plural electrical contacts, so that the plural electrical contacts are exposed to the notch.

7. The mouse device according to claim 6, wherein each replaceable switch module further comprises a first magnetic element, and the first magnetic element is fixed on the covering plate.

8. The mouse device according to claim 7, wherein the mouse device further comprises a second magnetic element, and the second magnetic element is fixed on a bottom surface of the main circuit board and aligned with the first magnetic element, wherein opposite poles of the first magnetic element and the second magnetic element face each other, and the replaceable switch module is fixed on the main circuit board in response to an attractive force between the first magnetic element and the second magnetic element.

9. The mouse device according to claim 1, wherein the covering plate further comprises an accommodation recess, wherein the accommodation recess is formed in a surface of the covering plate close to the switch circuit board, and the first magnetic element is accommodated within the accommodation recess.

10. The mouse device according to claim 1, wherein the mouse device further comprises an upper base, and the upper base is arranged between the lower cover and the upper cover, wherein the main circuit board is covered by the upper base, and two receiving grooves run through the upper base, wherein the two receiving grooves are aligned with the corresponding pogo pin connectors, and the two replaceable switch modules are accommodated within the corresponding receiving grooves.

* * * * *